May 5, 1964
C. E. J. NYBERG
3,131,905
QUICK-RELEASE COUPLING FOR HOSES AND THE LIKE
Filed March 7, 1961
2 Sheets-Sheet 1
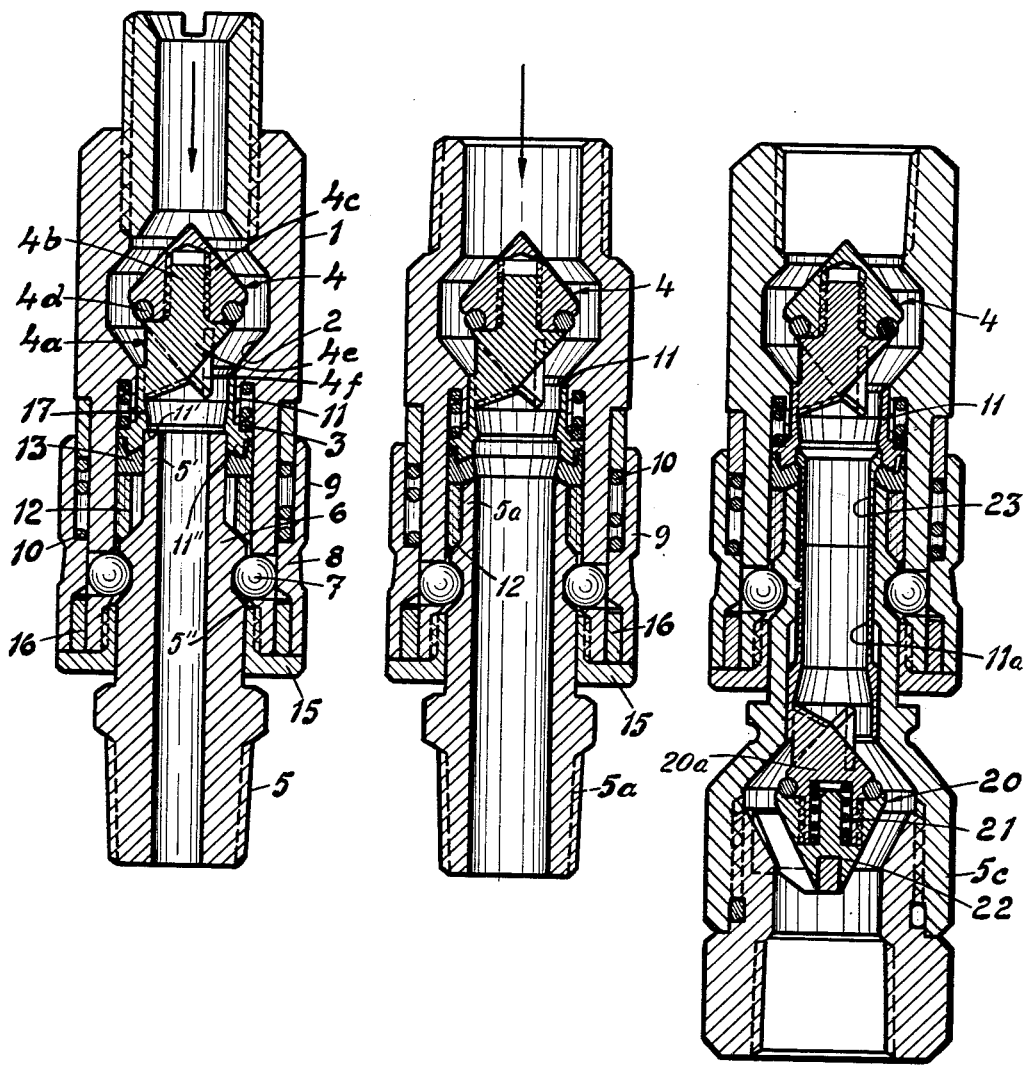
CARL ERIK JOSEF NYBERG
INVENTOR.
BY
AGENT

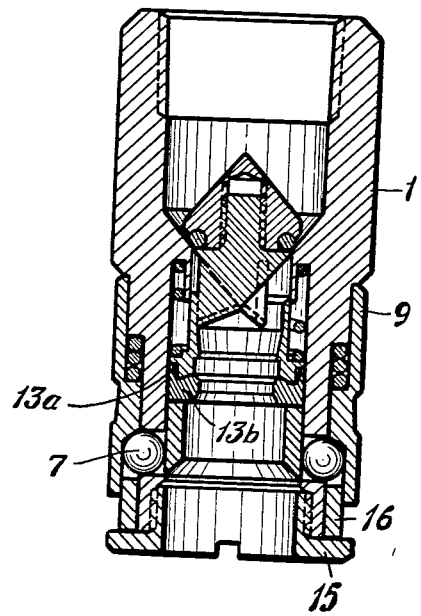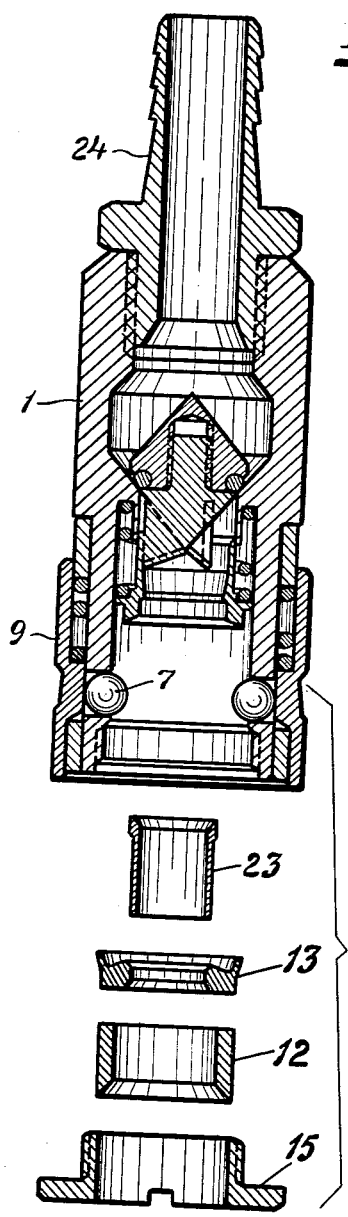

United States Patent Office 3,131,905
Patented May 5, 1964

3,131,905
QUICK-RELEASE COUPLING FOR HOSES
AND THE LIKE
Carl Erik Josef Nyberg, Clasborgsvagen 32,
Skovde, Sweden
Filed Mar. 7, 1961, Ser. No. 93,931
4 Claims. (Cl. 251—149.6)

The present invention relates to a quick-release coupling for hoses and the like, which comprises a female coupling section or sleeve member provided with a spring biased closure valve and a male coupling section of spigot member having an annular flange adapted to co-operate with a locking device located in the sleeve member and preferably consisting of balls, said spigot being adapted, when it is inserted into the sleeve member, to lift the valve member from its seat in the sleeve member and to be held in the inserted position by the locking device. The invention is specially concerned with the design of the sleeve member and its object is to enable the same female or sleeve member to be used with spigots which in certain respects are of different design; and the quick release coupling according to the invention is mainly characterized in that the valve member has a tubular boss portion guided in the bore of the sleeve member adapted to receive the spigot, that a retainer sleeve, which is adapted to hold the locking device in its released position when the spigot is removed from the sleeve part, is axially movable in the bore and adapted to be moved from its operative position by the flange of the spigot when the latter is inserted, and that between the tubular boss of the valve member and the retainer sleeve a sealing ring made of elastic material is movably mounted, the inner diameter of both the sealing ring and said tubular boss being less than the inner diameter of the retainer sleeve.

The invention is described in greater detail with reference to the embodiment shown in the accompanying drawing wherein FIG. 1 is a longitudinal section through a sleeve member, forming part of a quick-release conduit coupling according to the invention, with spigot inserted, while FIG. 2 shows the same sleeve member similarly combined with a spigot of different design; FIG. 3 shows a modified coupling according to the invention, designed for a hydraulic system; FIG. 4 shows the sleeve member of FIG. 1 without the spigot, while FIG. 5 shows in an exploded view how a sealing ring in the sleeve member can be changed.

In the figures, reference numeral 1 denotes a coupling sleeve made in one piece and constituting a tubular valve casing. In the sleeve there is a seat 2 for a closure valve 4 biased by a spring 3. Into the coupling sleeve 1 there is inserted the spigot 5 forming part of the coupling; in known manner the spigot is provided with an annular flange 6 which cams a set of balls 7 outwardly, upon insertion of the spigot through the lower casing end, and which separates the tips 5' of the spigot from a recess 5" in which the balls 7 engage to lock the spigot to the sleeve. The balls are held in their locking positions by a control sleeve 9 which has a locking abutment 8 and is maintained in inward-camming engagement with the balls by a spring 10.

The valve member 4 is formed in two parts and includes a main part 4a, which at the upper end has a threaded pin 4b screwed into an externally conical upper part 4c. An O-ring 4d of rubber or the like is fitted between an abutment surface around the pin 4b and the upper part 4c, and is adapted to bear on the seat 2 in the closed position of the valve.

The main part 4a is preferably cast and has a conical part 4e, from which project three fins 4f which are of triangular shape and which at their radially outer edges are connected to a tubular boss 11, guided in the bore of the coupling sleeve downstream of the seat 2.

A guard element in the form of a retainer sleeve 12 is movably mounted in the bore of the coupling sleeve 1 and between the sleeve 12 and the tubular boss 11 of the valve member a sealing ring 13 of rubber or the like is fitted. The sealing ring 13 has a substantially L-shaped cross-section with an outer axially extending leg 13a (see FIG. 4) which forms a collar engaging the wall of the leg 13b forming a frustoconical annular hub arm.

When the spigot 5 is inserted into the coupling sleeve 1, the flange 6 of the spigot engages the lower end of the sleeve 12 so that the latter is moved upwardly and, through the intermediary of the sealing ring 13, forces the valve member 4 upwardly against the action of the valve spring 3. The spigot 5 shown in FIG. 1 projects through the sealing ring 13, its tip 5' bearing upon a shoulder 11' of boss 11, and since the sealing ring 13 is axially compressed when the valve is opened it expands radially so that it comes into sealing engagement with the wall of the bore of the coupling sleeve and with the outside of the spigot 5. At the same time an annular formation 11" of wedge-shaped cross-section, constituting the lower end of boss 11, cams the hub 13b inwardly against tip 5' while providing clearance for flange 13a between itself and the cylindrical casing wall.

Owing, for example, to the varying length of different spigots it can however occur that the end surface of the spigot lifts the valve directly without the sealing ring being compressed at all or to any appreciable extent. The hub portion 13b of inner diameter of the sealing ring 13 in its uncompressed state (see FIG. 4) is however, preferably somewhat smaller than the outer diameter of the end part of the spigot 5, whilst the outer diameter of the free edge of the axially extending collar 13a of the sealing ring is originally somewhat larger than the inner diameter of the bore of the coupling sleeve 1. Upon the opening of the valve, the pressure of the traversing fluid forces the sealing ring into sealing engagement with the contact surfaces of the spigot 5 and the coupling sleeve 1.

The same coupling sleeve 1 is shown in FIG. 2 as in FIG. 1 but in combination with a spigot 5a of a construction somewhat different from that of the spigot 5 shown in FIG. 1. The spigot 5a has a flow passage wider than that of the spigot 5 and its end part 5a' beyond the flange 6 has a greater external diameter; this end part is also shorter than the corresponding part 5' of the spigot 5. In this case the sealing ring 13 makes sealing engagement with the end surface of the spigot which in the embodiment illustrated in FIG. 2 is slightly conical.

The coupling shown in FIG. 3 is designed for a hydraulic system, and the spigot 5c is also provided with a closure valve 20. The valve is biased in its closing direction by a spring 21, which is mounted in a recess in the valve and abuts against a fixed hub-like part 22 in the spigot. The tubular boss 11a of valve part 20a is longer than boss 11 and separated from the latter, when the parts of the coupling are assembled, by a spacing sleeve 23, which is mounted in the coupling sleeve 1 and which forms a direct mechanical connection between the two valves during the assembly. The opening movement of the valve 20 is limited by the hub part 22 and its spring 21 is weaker than the spring 3 of the valve 4. The coupling is otherwise substantially the same as the construction shown in FIG. 2.

A sleeve member with its spigot removed is shown in FIG. 4. To release the coupling the control sleeve 9 is moved upwardly from the position illustrated in FIG. 1. This moves the abutment 8 away from the locking position beyond the balls 7 so that they can move radially outwards, and in this way the spigot is released.

After the spigot has been removed the different parts of the sleeve member assume the positions shown in FIG. 4. Thus the balls 7 are locked in the released position by the retainer sleeve 12. The lower edge of the control sleeve 9 prevents the balls 7 from falling out of their recesses in the coupling sleeve 1 and the balls in their turn prevent the control sleeve from returning to its locking position. As shown in FIG. 4, there exists in the illustrated position an axial clearance for the sealing ring 13, and consequently the force of the spring 3 is used entirely for closing the valve.

A bushing 15 is screwed into the insertion end of the coupling sleeve 1 and forms a guide for the spigot, and a ring 16 is pressed on to the outside of the coupling sleeve.

The connection between the valve cone 4c of the valve member 4 and the latter's tubular part 11 is constituted by the three relatively thin spoke-like fins 4f which do not offer much resisatnce to flow. As can be seen from FIGS. 1 and 2, the fluid flowing through the coupling is subject to very little disturbances, and consequently the flow resistance as a whole is very low. This is also assisted by the fact that the valve spring 3 is located downstream and radially outside of the flow opening in the seat 2, where it cannot cause any disturbance. In order further to improve the flow, boss 11 has a converging inner surface 17 above shoulder 11' so as to form a stream-shaping nozzle inside the spring 3.

FIG. 5 illustrates how a sealing ring is changed in the coupling sleeve 9 according to FIG. 3. The bushing 15 is first removed, and the control sleeve is then moved upwardly on the coupling sleeve 1. The control sleeve then assumes a position corresponding to that shown in FIG. 4 in which the locking balls are fully released so that the retainer sleeve 12 and sealing ring 13 can be easily removed from the bore of the coupling sleeve 1. In order to prevent the balls 7 from falling inwardly and being removed from their recesses, the diameter at the inner edge of these recesses may be slightly smaller than the diameter of the balls. After the sleeve 12 has been removed the control sleeve 9 is moved to the position shown in FIG. 5, in which it is held by the ring 16. A nozzle 24 is shown attached to sleeve 1 in FIG. 5.

In order to render sealing possible with the spigot 5a of FIG. 2, the inner diameter of the sleeve 12 must be larger than the diameter of the tubular boss 11 of the valve member 4 so that this boss forms a radially inwardly projecting shoulder which serves as an abutment for the hub part 13b of the sealing ring 13.

What I claim is:

1. In a quick-release conduit coupling, a female coupling section comprising a tubular casing formed with an annular internal valve seat, a valve member between said seat and an end of said casing axially displaceable within said casing between a first axial position wherein said member engages said seat and a second axial position closer to said end wherein said member is spaced from said seat and forms therewith an annular clearance communicating with the bore of said casing, spring means in said casing bearing upon said valve member for urging it toward said seat, said valve member being formed with a tubular portion axially extending within said bore toward the opposite end of said casing, a sealing ring of resiliently deformable material movably disposed within said bore in contact with the wall thereof between said tubular portion and said opposite end of said casing, and a sleeve axially displaceable in said bore adjacent said ring between the latter and said opposite end, said tubular portion and said ring having confronting sealing surfaces projecting inwardly beyond the inner wall of said sleeve into the path of a male coupling section insertable into said casing through said opposite end whereby said sealing ring is compressible against said portion and said casing by the insertable male coupling section.

2. A female coupling section according to claim 1 wherein said ring has a frusto conical annular hub and an annular flange extending axially beyond said hub along the wall of said bore in the direction of said valve member, said tubular portion being provided at its confronting surface with an annular formation of wedge-shaped cross-section spaced from said wall, thereby forming an annular recess adapted to receive said flange, said formation being disposed to exert inward camming pressure upon said hub upon said male coupling section forcing said ring against said tubular portion.

3. In a quick-release conduit coupling, a female coupling section adapted to co-operate with any one of a plurality of male coupling sections having insertion tips of different diameters; said female coupling section comprising:
    a tubular casing having a first and a second end, said casing being formed with an internal annular valve seat between said ends;
    a valve member between said seat and said first end axially displaceable within said casing between an open position closer to said first end and a closed position farther from said first end, said valve member resting against said seat in said closed position, said valve member being provided with a tubular portion extending within said seat and having an inner annular shoulder facing said other end;
    spring means in said casing bearing upon said valve member for urging it toward said seat;
    a sealing ring of resiliently deformable material movably disposed within said tubular casing in contact with the wall thereof and adjacent said tubular portion between the latter and said second end;
    locking means for a male coupling section inserted through said second end, including a plurality of locking balls axially displaceable in recesses of the casing wall at an annular zone of said casing between said ring and said second end, said balls being outwardly cammable by an outer flange on said male coupling section and being receivable in a recessed part of said male coupling section separated by said outer flange from the tip thereof;
    and a retainer sleeve in said casing for holding said balls in their outwardly cammed position upon the withdrawal of said male coupling section, said sleeve being axially movable in said casing between said annular zone and said ring for axial entrainment by said outer flange upon insertion of said male coupling section for compressing said ring between said sleeve, said tubular portion, said casing wall and the tip of said male coupling section upon said tip being narrow enough to clear said ring and to contact said shoulder, said ring and said tubular portion projecting radially inward beyond the inner wall surface of said sleeve for axial compression of said ring between said tubular portion and said tip upon the latter being so wide as substantially to contact said sleeve.

4. A female coupling section according to claim 3 wherein said ring has an inner diameter less than that of said tubular portion between said ring and said shoulder.

References Cited in the file of this patent

UNITED STATES PATENTS

| 2,279,146 | Schneller | Apr. 7, 1942 |
| 2,457,251 | Main | Dec. 28, 1948 |
| 2,568,516 | Scheiwer | Sept. 18, 1951 |
| 2,842,382 | Franck | July 8, 1958 |
| 3,052,261 | Nyberg | Sept. 4, 1962 |

FOREIGN PATENTS

| 562,840 | Great Britain | July 18, 1944 |